(12) United States Patent
Takeo

(10) Patent No.: US 9,574,635 B2
(45) Date of Patent: Feb. 21, 2017

(54) SHOCK ABSORBER

(71) Applicant: KAYABA INDUSTRY CO., LTD., Tokyo (JP)

(72) Inventor: Satoru Takeo, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/414,974

(22) PCT Filed: Jul. 23, 2013

(86) PCT No.: PCT/JP2013/069858
§ 371 (c)(1),
(2) Date: Jan. 15, 2015

(87) PCT Pub. No.: WO2014/024669
PCT Pub. Date: Feb. 13, 2014

(65) Prior Publication Data
US 2015/0167775 A1    Jun. 18, 2015

(30) Foreign Application Priority Data

Aug. 10, 2012  (JP) .................................. 2012-177902

(51) Int. Cl.
*F16F 9/38* (2006.01)
*F16F 9/19* (2006.01)
*F16F 9/36* (2006.01)

(52) U.S. Cl.
CPC . *F16F 9/38* (2013.01); *F16F 9/19* (2013.01); *F16F 9/361* (2013.01)

(58) Field of Classification Search
CPC ......... B60G 17/044; B60G 17/048; F16F 9/38

USPC .............. 188/322.22; 267/220, 64.26, 64.19, 267/64.21, 64.28

See application file for complete search history.

(56) References Cited

U.S. PATENT DOCUMENTS

| 2,163,255 | A | | 6/1939 | Binder et al. | |
|---|---|---|---|---|---|
| 3,165,306 | A | * | 1/1965 | Tea | B60G 15/065 267/220 |
| 3,391,922 | A | * | 7/1968 | Axthammer | B60G 17/044 267/64.17 |
| 3,399,882 | A | * | 9/1968 | Hausmann | B60G 17/048 267/292 |
| 4,249,645 | A | * | 2/1981 | Level | F16F 9/38 188/322.12 |

FOREIGN PATENT DOCUMENTS

| DE | 2845243 A1 | * | 4/1980 | ................ F16F 9/38 |
|---|---|---|---|---|
| EP | 0457658 A1 | * | 11/1991 | ............. C22C 38/38 |
| JP | 59-197635 A | | 11/1984 | |
| JP | 01-065439 U | | 4/1989 | |
| JP | 2000-081071 A | | 3/2000 | |
| JP | 2007-071246 A | | 3/2007 | |
| JP | 2010-116997 A | | 5/2010 | |
| JP | 2010-175043 A | | 8/2010 | |

* cited by examiner

*Primary Examiner* — Melanie Torres Williams
(74) *Attorney, Agent, or Firm* — Rabin & Berdo, P.C.

(57) ABSTRACT

A shock absorber including a cylindrical outer shell and a piston rod slidably inserted into the outer shell, the shock absorber includes a cylindrical dust cover that is coupled to the piston rod and that permits an entry of the outer shell to inside thereof, and a cylindrical bellows whose one end is attached to the outer shell and whose another end is arranged inside the dust cover at all times to cover an outer periphery of the piston rod.

4 Claims, 2 Drawing Sheets

SHOCK ABSORBER

TECHNICAL FIELD

The present invention relates to a shock absorber.

BACKGROUND ART

A shock absorber includes an outer shell and a piston rod that is slidably inserted into the outer shell. When the piston rod moves relatively to the outer shell in the axial direction, the shock absorber exhibits damping force that suppresses the relative movement of the piston rod relative to the outer shell. Such a shock absorber is used by being interposed between a body and an axle, or between a cabin and the body in a vehicle, for example. Vibration of an object to be damped, such as the body, the cabin or the like, can be suppressed by the damping force exhibited by the shock absorber.

As the shock absorber like this is exposed to the outside for use, dirt, dust and mud (hereinafter referred to as "mud or the like") are easily adhered onto the piston rod. The mud or the like, adhered onto the outer periphery of the piston rod, is scraped off by a dust seal that seals the outer periphery of the piston rod, when the piston rod enters the outer shell. However, when the mud or the like is dried and adhered onto the piston rod stubbornly, it cannot be scraped off properly by the dust seal. This may facilitate deterioration in oil seal provided on an inner side of the dust seal. For this reason, according to the shock absorber as disclosed in JP2000-81071A or JP2010-175043A, a dust cover that covers the outer periphery of the piston rod is mounted so as to protect the piston rod from the mud or the like.

SUMMARY OF INVENTION

With the shock absorber including the dust cover as described above, the adherence of the mud or the like onto the piston rod can be prevented to a greater extent as the length of the dust cover becomes longer. When the length of the dust cover becomes longer, however, the dust cover covers the outer shell when the outer surface of the outer shell is subjected to spray coating. Thus, an uncoated part is caused at the upper end of the outer shell in particular. The uncoated part on the outer shell like this is not preferable from the viewpoint of rust prevention on the outer shell.

For this reason, the dust cover of the shock absorber as disclosed in JP2000-81071A has such total length that slightly covers the upper end of the outer shell when it is expanded to the utmost, so that the uncoated part is not caused. In such a case, however, the mud or the like easily enters the dust cover from a space between the outer shell and the dust cover, as a result of which the effect of protecting the outer periphery of the piston rod is decreased.

Further, the dust cover of the shock absorber as disclosed in JP2010-175043A has such total length that an entry of the mud or the like can be suppressed sufficiently. Therefore, the spray coating is carried out before attaching the dust cover. In this case, however, such processing is required as to push the piston rod into the outer shell, keep the shock absorber in the most contracted state, and then subject the outer periphery of the outer shell to the spray coating, so as to prevent a sliding surface on the outer periphery of the piston rod from being coated. Such processing has the need to set the shock absorber on a machine for the spray coating, and mask the outer periphery of the piston rod before coating the outer shell, and hence, the coating method becomes complicated. Thus, a new problem is caused, that is, labor and a man-hour are required for the coating processing.

An object of the present invention is to provide a shock absorber that can protect the outer periphery of the piston rod sufficiently, and that does not deteriorate coating workability.

According to one aspect of the present invention, a shock absorber including a cylindrical outer shell and a piston rod slidably inserted into the outer shell, the shock absorber includes a cylindrical dust cover coupled to the piston rod and that permits an entry of the outer shell to inside thereof, and a cylindrical bellows whose one end is attached to the outer shell and whose another end is arranged inside the dust cover at all times to cover an outer periphery of the piston rod.

DESCRIPTION OF EMBODIMENTS

Hereinafter, an embodiment of the present invention will be explained with reference to the drawings.

Figure 1:
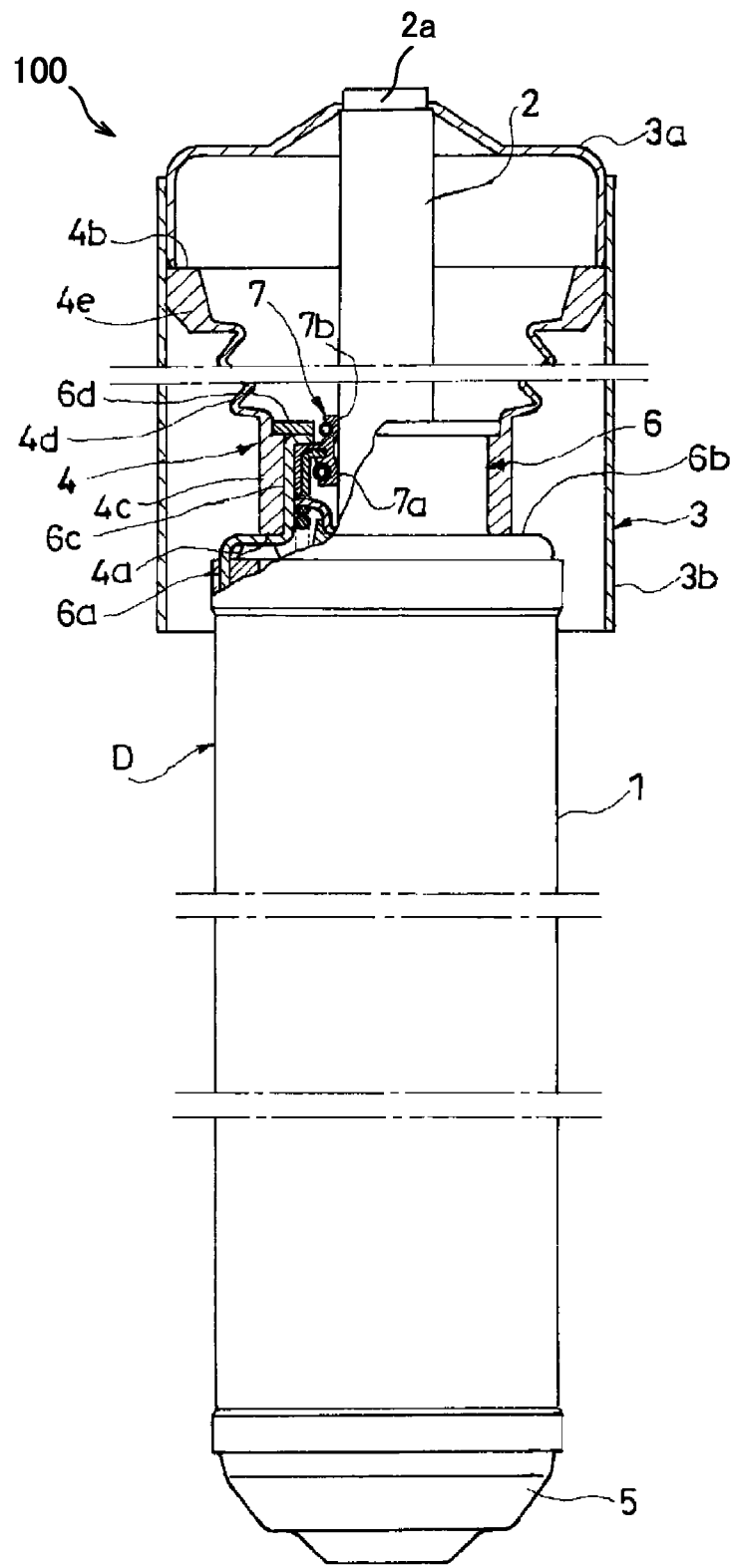
FIG. 1 is a side view of a shock absorber according to an embodiment of the present invention.

As illustrated in FIG. 1, a shock absorber 100 according to this embodiment includes a shock absorber body D that has a cylindrical outer shell 1 and a piston rod 2 capable of sliding inside the outer shell 1, a cylindrical dust cover 3 coupled to the piston rod 2 and permitting an entry of the outer shell 1 to inside thereof, and a cylindrical bellows 4 whose one end 4a is attached to the outer shell 1 and the other end 4b is arranged inside the dust cover 3 at all times to cover the outer periphery of the piston rod 2.

Although not illustrated specifically, the shock absorber body D includes, for example, an inner tube that is received inside the outer shell 1, a piston that is slidably inserted inside the inner tube, the piston rod 2 that is movably inserted into the inner tube with its one end being coupled to the piston, an expanding-side chamber and a contracting-side chamber that are divided by the piston inside the inner tube, and a passage that allows the expanding-side chamber and the contracting-side chamber to communicate. A hydraulic fluid, such as hydraulic oil, is filled inside the expanding-side chamber and the contracting-side chamber. For example, liquids such as water, aqueous solution and the like may be used as the hydraulic fluid, other than the hydraulic oil.

When the piston rod 2 makes relative movement in the axial direction relative to the outer shell 1 by external forces, in other words, when the shock absorber body D expands and contracts by the external forces, the piston, together with the piston rod 2, moves in the axial direction, and allows the expanding-side chamber or the contracting-side chamber inside the inner tube to contract, as a result of which a pressure difference is caused between pressures of the expanding-side chamber and the contracting-side chamber. By receiving this pressure difference by the piston, the shock absorber body D exhibits damping force that suppresses the relative movement in the axial direction of the outer shell 1 and the piston rod 2.

The shock absorber body D according to this embodiment is a single-rod type, in which the piston rod 2 is inserted into the expanding-side chamber only. It should be noted that the shock absorber body D includes a reservoir that is formed as annular gap between the outer shell 1 and the inner tube and that has a gas and a liquid filled therein, although not illustrated. The reservoir compensates for the volume of the piston rod 2 that enters and exits from the outer shell, according to the expansion and contraction of the shock absorber body D. Thus, the shock absorber body D according to this embodiment is a single-rod multi-cylinder type. In a case where the piston divides the inside of the outer shell 1 into the expanding-side chamber and the contracting-side chamber with being allowed to move slidingly and directly on the inner periphery of the outer shell 1, an air chamber that compensates for the volume of the piston rod 2 may be defined in the outer shell 1 by inserting a free piston slidably inside the outer shell 1, or a gas chamber may be provided defined in the outer shell 1 by an elastic partition such as a bladder. In this case, the shock absorber body D may be a single-cylinder type without providing the inner tube. Moreover, the shock absorber body D may be a double-rod type, not the single-rod type.

Hereinafter, respective components will be explained in detail. The outer shell 1 is a cylindrical member, whose lower end in FIG. 1 is sealed by a cap 5, and whose upper end in FIG. 1, as the end on the piston rod side of the outer shell 1, has a cylindrical seal case 6 mounted thereon.

The seal case 6 includes a cylindrical large-diameter portion 6a mounted on the inner periphery of the outer shell 1 at the end on the piston rod side, a flange portion 6b projecting from the large-diameter portion 6a at the end on the piston rod side toward the inner side in the radial direction, a cylindrical small-diameter portion 6c rising from the inner periphery of the flange portion 6b toward the upper end side, and an annular stopper 6d provided on the small-diameter portion 6c. The small-diameter portion 6c receives a seal member 7 therein. The stopper 6d has the outer diameter that is larger than the small-diameter portion 6c, and is mounted on the upper end of the small-diameter portion 6c by welding or the like.

The seal member 7 includes a seal portion 7a brought into slidable contact with the outer periphery of the piston rod 2 and sealing the outer periphery of the piston rod 2 so as to prevent leakage of the liquid from the outer shell 1, and a dust seal portion 7b scraping off dust adhered onto the outer periphery of the piston rod 2.

The dust cover 3 is mounted on an upper end 2a of the piston rod 2 in FIG. 1. The dust cover 3 includes an annular coupling portion 3a whose inner periphery is attached to the outer periphery of the piston rod 2, and a cover body 3b extending downwardly in FIG. 1 from the outer periphery of the coupling portion 3a. The inner diameter of the cover body 3b is larger than the outer diameter of the outer shell 1, and the outer shell 1 can enter the cover body 3b. Thus, the dust cover 3 does not hinder the expansion and contraction of the shock absorber body D.

Figure 2:
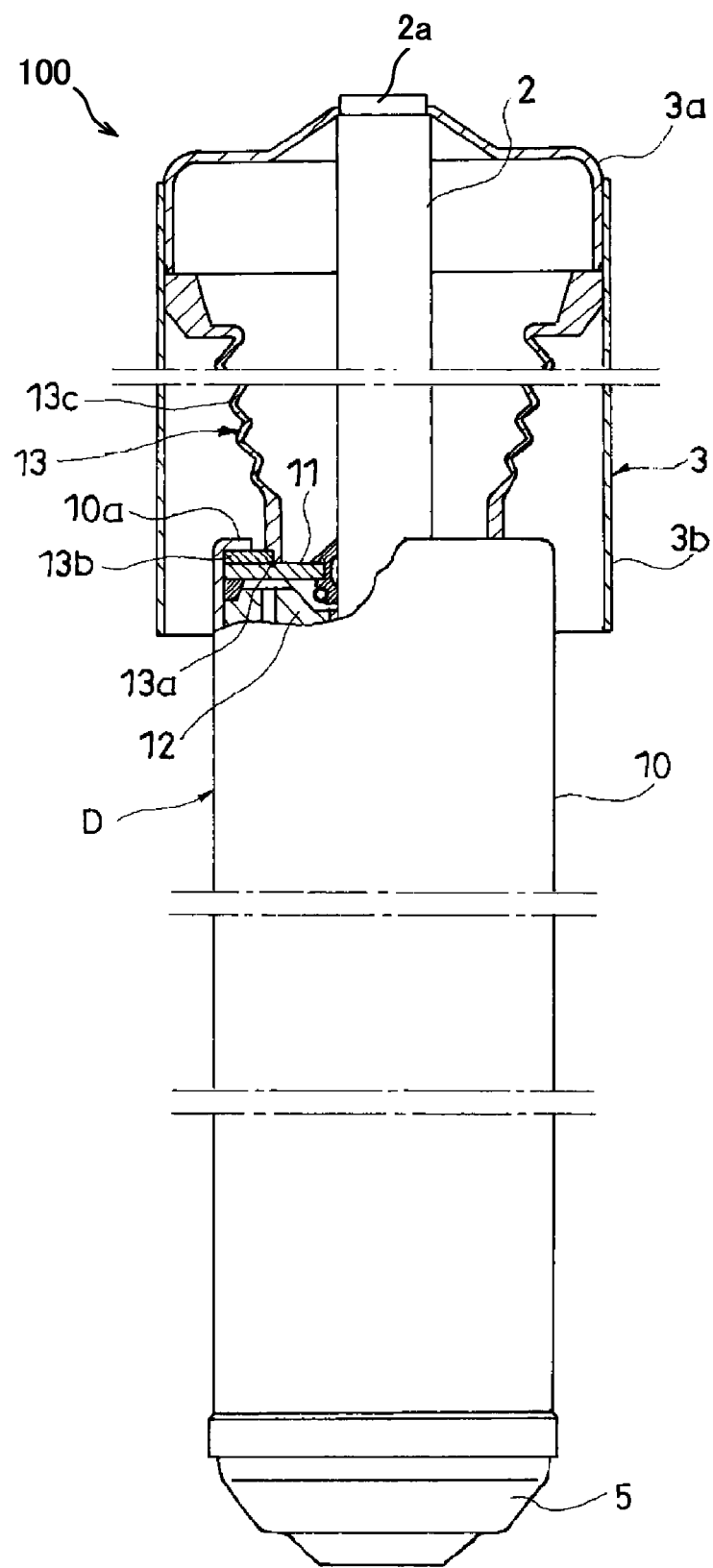
FIG. 2 is a side view of a shock absorber according to a modification example of the embodiment of the present invention.

The bellows 4 is formed by rubber or synthetic resin, for example. The bellows 4 includes a cylindrical fitting portion 4c at the one end 4a as the lower end in FIG. 1. The fitting portion 4c is fitted to the outer periphery of the small-diameter portion 6c of the seal case 6. As the fitting portion 4c is sandwiched between the flange portion 6b and the stopper 6d, the bellows 4 is attached to the outer shell 1 via the seal case 6. Thus, the attachment of the bellows 4 to the outer shell 1 may be made not only in a direct manner such as a later-described shock absorber as illustrated in FIG. 2, but also in an indirect manner via the seal case 6 or the like.

Moreover, the bellows 4 includes a bellows portion 4d at the position higher than the fitting portion 4c. An annular slide contacting portion 4e is provided on the other end 4b, as the end higher than the bellows portion 4d, and the outer periphery of the slide contacting portion 4e is brought into slidable contact with the inner periphery of the dust cover 3.

With regard to the bellows 4, the other end 4b has the larger diameter than that of the one end 4a mounted on the outer shell 1, and the diameter of the bellows portion 4d is increased gradually toward the other end 4b.

When the shock absorber body D is contracted to the utmost, the slide contacting portion 4e, provided on the other end 4b of the bellows 4, abuts against the lower end of the coupling portion 3a of the dust cover 3, and the bellows portion 4d is contracted and shrunk. When the shock absorber body D is expanded to the utmost, the shrunk bellows portion 4d extends, and the slide contacting portion 4e that is provided on the other end 4b of the bellows 4 follows the movement of the dust cover 3 toward the upper direction in FIG. 1. This makes it possible to prevent falling-off of the other end 4b of the bellows 4 from the inside to the outside of the dust cover 3, when the shock absorber body D expands. Namely, the position of the other end 4b of the bellows 4, when the shock absorber body D is expanded to the utmost and the bellows 4 has the natural length (the length in the axial direction when no load is applied thereto), is set at the position higher than the position of the lower end of the dust cover 3 in FIG. 1. Thereby, the other end 4b of the bellows 4 is arranged inside the dust cover 3 at all times.

When the bellows 4 is mounted on the outer shell 1 as described above, the bellows 4 covers the outer periphery of the piston rod 2, and the dust cover 3 and the bellows 4 block the space on the outer periphery of the piston rod 2 from the outside. This makes it possible to prevent the mud or the like from adhering onto the piston rod 2.

Further, the attachment of the bellows 4 does not hinder spray coating onto the outer surface of the outer shell 1, and the length of the dust cover 3 may be equal to that of the conventional shock absorber. Therefore, even when the coating is made with this state, an uncoated part is not caused on the outer surface of the outer shell 1, and therefore, rust on the outer shell 1 can be prevented. Furthermore, it is not necessary to employ such a complicated coating method as to keep the shock absorber body D as the most contracted state before attaching the dust cover 3, and to mask the piston rod 2 before coating the outer shell 1. The spray coating can be carried out without any change. Thus, coating processing is quite simple.

According to the shock absorber 100 of this embodiment as described thus far, it is possible to protect the outer periphery of the piston rod 2 sufficiently, and to prevent deterioration in coating workability.

Further, as the outer periphery of the other end 4b of the bellows 4 is brought into slidable contact with the inner periphery of the dust cover 3, it becomes possible to suppress vibration of the bellows 4 in the radial direction. Thus, it becomes possible to reduce hammering sounds caused between the bellows 4 and the dust cover 3.

Furthermore, as the bellows 4 covers the outer periphery of the piston rod 2, the bellows 4 functions as a liquid reservoir. Because of this, even when the liquid inside outer shell 1 gets over the seal member 7 and oozes to the outside, it makes possible to prevent the leakage of the liquid to the outside of the shock absorber.

As the outer periphery of the other end 4b of the bellows 4 is entirely brought into slidable contact with the inner periphery of the dust cover 3, as described above, it is possible to block the space on the outer periphery of the piston rod 2 from the outside, and to prevent the entry of the mud or the like completely. However, there may be a partial gap therebetween, without bringing the entire outer periphery of the other end 4b of the bellows 4 into slidable contact with the inner periphery of the dust cover 3. In this case also, an entry route of the mud or the like to the piston rod 2 becomes longer than that of the conventional shock absorber that includes the dust cover 3 only, and the mud or the like hardly enters the dust cover 3. Thus, the adherence of the mud or the like onto the piston rod 2 can be prevented. Even when the other end 4b of the bellows 4 is not brought into slidable contact with the inner periphery of the dust cover 3 at all, the entry route of the mud or the like to the piston rod 2 becomes longer than that of the conventional shock absorber that includes the dust cover 3 only, and hence, the adherence of the mud or the like onto the piston rod 2 can be prevented.

The structure of fixing the bellows to the outer shell may be different from the above-described structure. The shock absorber as illustrated in FIG. 2 includes a bending portion 10a that is the upper end of an outer shell 10 being bent toward the inner side at the end on the piston rod side in FIG. 2. The bending portion 10a fixes a seal member 11 that seals the outer periphery of the piston rod 2 and a rod guide 12 that pivotally supports the outer periphery of the piston rod 2 to the outer shell 10. In this case, an annular fixing portion 13b that is inserted into the inner periphery of the outer shell 10 at the end on the piston rod side may be provided at one end 13a of a bellows 13, so as to fix the bellows 13 to the outer shell 10, as the fixing portion 13b holds the bending portion 10a.

Further, the annular fixing portion 13b that is fixed to the bending portion 10a of the outer shell 10 may be formed separately from the bellows 13, although not illustrated. In this case, a flange is provided on the outer periphery of the one end 13a of the bellows 13, and a holding portion that forms gap in which the flange is inserted between itself and the rod guide 12 is provided on the inner periphery of the fixing portion 13b. The flange is sandwiched between the holding portion of the fixing portion 13b and the rod guide 12, so as to fix the bellows 13 to the outer shell.

The fixing portion 13b may be made of metal or by the same material as that of the bellows 13. When a bellows portion 13c of the bellows 13 is made of rubber and the fixing portion 13b is made of metal, for example, the rubber that forms the bellows portion 13c may be welded, fused, adhered or the like to the fixing portion 13b for integration.

Embodiments of this invention were described above, but the above embodiments are merely examples of applications of this invention, and the technical scope of this invention is not limited to the specific constitutions of the above embodiments.

This application claims priority based on Japanese Patent Application No. 2012-177902 filed with the Japan Patent Office on Aug. 10, 2012, the entire contents of which are incorporated into this specification.

The invention claimed is:

1. A shock absorber including a cylindrical outer shell and a piston rod slidably inserted into the outer shell, the shock absorber comprising:

a cylindrical dust cover coupled to the piston rod and permitting an entry of the outer shell to an inside of the dust cover; and a cylindrical bellows whose one end is attached to the outer shell and another end of the bellows being arranged inside the dust cover at all times to cover an outer periphery of the piston rod, wherein the dust cover has a sufficient length to cover a piston rod side end of the outer shell in a most elongated position of the shock absorber where the piston rod is most projected from the outer shell, the another end of the bellows has a greater diameter than that of the one end of the bellows such that a diameter of the bellows gradually increases from the one end towards the another end, an outer periphery of the another end of the bellows is in slidable contact with an inner periphery of the dust cover, and the bellows include a bellows portion.

2. The shock absorber according to claim 1, further comprising a cylindrical seal case provided on the outer shell at the piston rod side end of the outer shell, wherein the seal case includes:

a cylindrical large-diameter portion attached to an inner periphery of the outer shell at the piston rod side end of the outer shell, a flange portion projecting from the large-diameter portion at an end of the large-diameter portion on a side of the piston rod toward an inner side, a cylindrical small-diameter portion rising from an inner periphery of the flange portion, and an annular stopper provided on the small-diameter portion, wherein the bellows includes, at the one end of the bellows, a cylindrical fitting portion fitted to an outer periphery of the small-diameter portion, and wherein the fitting portion is sandwiched between the flange portion and the stopper to fix the bellows to the outer shell.

3. The shock absorber according to claim 1, wherein the bellows includes, at the one end of the bellows, an annular fixing portion inserted into an inner periphery of the outer shell at the piston rod side end of the outer shell, wherein the outer shell includes a bending portion bent toward an inner side, the bending portion being provided at a part of the outer shell at the piston rod side end of the outer shell, and wherein the bending portion holds the fixing portion so that the bellows are fixed to the outer shell.

4. The shock absorber according to claim 1, wherein the bellows includes a cylindrical fitting portion corresponding to the one end of the bellows, and a slide contracting portion corresponding to the another end of the bellows, wherein the bellows portion is located between the cylindrical fitting portion and the slide contracting portion.

* * * * *